United States Patent
Mackay et al.

(10) Patent No.: US 12,210,219 B2
(45) Date of Patent: Jan. 28, 2025

(54) SYSTEM, DEVICE, AND METHOD FOR DETERMINING OPTICAL ARTICLE FEASIBILITY

(71) Applicant: ESSILOR INTERNATIONAL, Charenton-le-Pont (FR)

(72) Inventors: Elliott Mackay, Dallas, TX (US);
Manuel Ordaz, Dallas, TX (US);
Ashley Sims, Dallas, TX (US);
Bernard Phanh, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 687 days.

(21) Appl. No.: 17/311,822

(22) PCT Filed: Dec. 9, 2019

(86) PCT No.: PCT/EP2019/084164
§ 371 (c)(1),
(2) Date: Jun. 8, 2021

(87) PCT Pub. No.: WO2020/120373
PCT Pub. Date: Jun. 18, 2020

(65) Prior Publication Data
US 2022/0019093 A1    Jan. 20, 2022

(30) Foreign Application Priority Data
Dec. 10, 2018 (EP) ................................. 18306651

(51) Int. Cl.
*G02C 13/00* (2006.01)
*G02C 7/02* (2006.01)
*G06Q 30/0601* (2023.01)

(52) U.S. Cl.
CPC .......... *G02C 13/003* (2013.01); *G02C 7/027* (2013.01); *G06Q 30/0621* (2013.01); *G06Q 30/0641* (2013.01)

(58) Field of Classification Search
CPC ...... G02C 13/005; G02C 13/003; G02C 5/00; G02C 5/02; G02C 5/008; G02C 5/12;
(Continued)

(56) References Cited

U.S. PATENT DOCUMENTS

2015/0055085 A1*  2/2015  Fonte ................. G02C 7/027
                                                        700/98

FOREIGN PATENT DOCUMENTS

WO    2017/196948       11/2017
WO    WO-2017196948 A1 *  11/2017  ........... G02C 13/005

OTHER PUBLICATIONS

International Search Report and Written Opinion of the ISA for PCT/EP2019/084164 dated Feb. 21, 2020, 14 pages.

* cited by examiner

*Primary Examiner* — Travis S Fissel
(74) *Attorney, Agent, or Firm* — NIXON & VANDERHYE

(57) ABSTRACT

A method, system, and non-transitory computer readable medium for determining optical article feasibility are provided. The method includes acquiring a first input indicative of optical criteria associated with a lens via a user interface, acquiring a second input indicative of a lens selection via the user interface, identifying one or more frames, and determining whether each frame of the one or more frames and the lens selection are physically compatible by fit simulation performed based on three dimensional cutout data determined based on at least the optical criteria. A feasibility (Continued)

indication is provided to a user via the user interface for each of the one or more frames based on the determination.

12 Claims, 6 Drawing Sheets

(58) Field of Classification Search
CPC . G02C 5/122; G02C 5/14; G02C 5/20; G02C 7/027; G06Q 30/0621; G06Q 30/0641; G06Q 30/0631
USPC .......................... 351/41, 158, 148, 204, 205
See application file for complete search history.

412 — Select the prescription for the patient

| OD Sphere | OD Cylinder | OD Axis | OD Addition | OD PD |
|---|---|---|---|---|
| +4.75 | -2.25 | 6 | 2.25 | 32 |

| OS Sphere | OS Cylinder | OS Axis | OS Addition | OS PD |
|---|---|---|---|---|
| +7.75 | -3.25 | 6 | 2.25 | 32 |

The following products can be used with the patients prescription
(Select the best lens that best fits your needs)

Multifocal 1 in PC Clear
Multifocal 2 in 1.67
Progressive 1 in PC
Progressive 2 in 1.67
Other designs in other materials

416

418 — Next

| Select your favorite frames | | | |
|---|---|---|---|
| Identifier | Name | Picture | Select your frame |
| 82850523738 | 17116 |  | ✓ |
| 828509017738 | 17115 |  | ✓ |
| 828509017745 | 17182 |  |  |
| 828501523738 | 17131 |  | ✓ |
| 8285099863738 | 17163 |  |  |
| 828509017745 | 17452 |  | ✓ |

420 — Next

406
| Try on your favorite frames and select the one you love ||||
| Code | Name | Picture | Select your frame |
|---|---|---|---|
| 82850523738 | 17116 |  | ✓ |
| 828509017738 | 17115 |  | |
| 828501523738 | 17131 |  | |
| 828509017745 | 17452 |  | |
422 — Next
Fig. 4D
408
Enter fitting height
17   424
426
Message Board
The selected parameters for the frame and lens are acceptable for cutout.
Fig. 4E

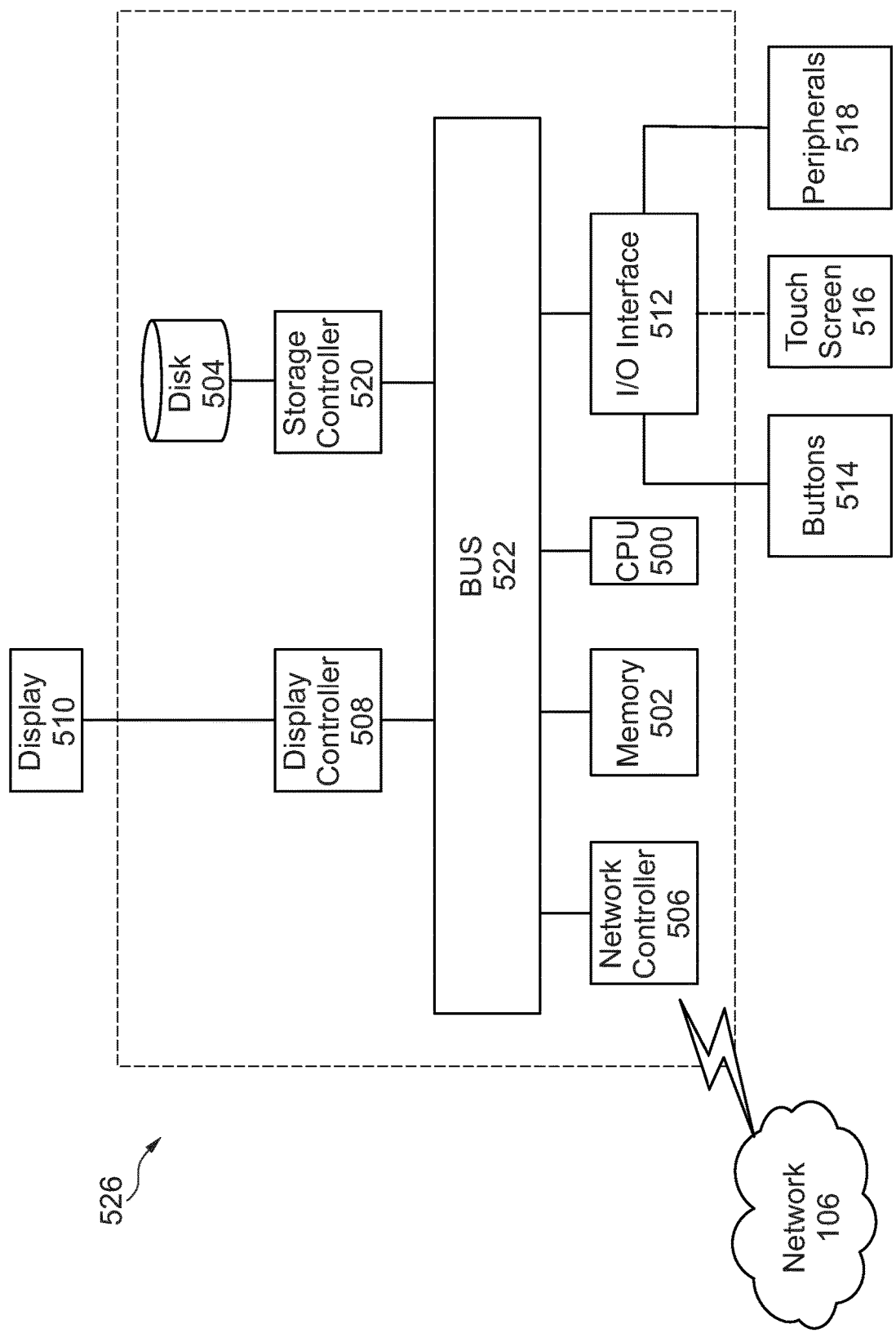

SYSTEM, DEVICE, AND METHOD FOR DETERMINING OPTICAL ARTICLE FEASIBILITY

This application is the U.S. national phase of International Application No. PCT/EP2019/084164 filed Dec. 9, 2019 which designated the U.S. and claims priority to EP patent application Ser. No. 18/306,651.3 filed Dec. 10, 2018, the entire contents of each of which are hereby incorporated by reference.

BACKGROUND

1. Field

This invention generally relates to optical article feasibility. In particular, the invention relates to determining optical feasibility when ordering optical articles.

2. Background

Typically, eye care professionals prescribe prescriptions for spectacles, lenses, and/or contact lenses. Then, the patient selects the frames from a variety of frames. The optician may verify the fit and take measurement using a two dimensional cut out. Then, the order is sent to a manufacturer or a laboratory that produces the selected frame and lenses. However, not all frame and lens combinations can be produced. For example, some lenses cannot be integrated with certain frames. Existing systems such as measuring devices may not take in to consideration lens design limitations, frame limitations, and cutout. In some cases, the dispensing optician is inexperienced. The conventional cutout chart being only two dimensional is not sufficient to determine optical article feasibility. If the frame and lens combination cannot be produced, which may take days to find out, the order is cancelled. Every day, a large number of orders are cancelled due to mounting issues and cutout/diameter issues.

Accordingly, what is needed, as recognized by the present inventors, is a method and a system capable of determining optical article feasibility before accepting and transmitting an order to the manufacturing facilities.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for optical article feasibility. The method includes acquiring a first input indicative of optical criteria associated with a lens via a user interface, acquiring a second input indicative of a lens selection via the user interface, identifying one or more frames, determining, using processing circuitry, whether each frame of the one or more frames and the lens selection are physically compatible by fit simulation performed based on three dimensional cutout data determined based on at least the optical criteria, and providing a feasibility indication to a user via the user interface for each of the one or more frames based on the determination.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4A, 4B, 4C, 4D, 4E and 4F are schematics that show user interfaces of the system according to one example; and FIG. 5 is an exemplary block diagram of a computer according to one example.

DETAILED DESCRIPTION

Figure 1:
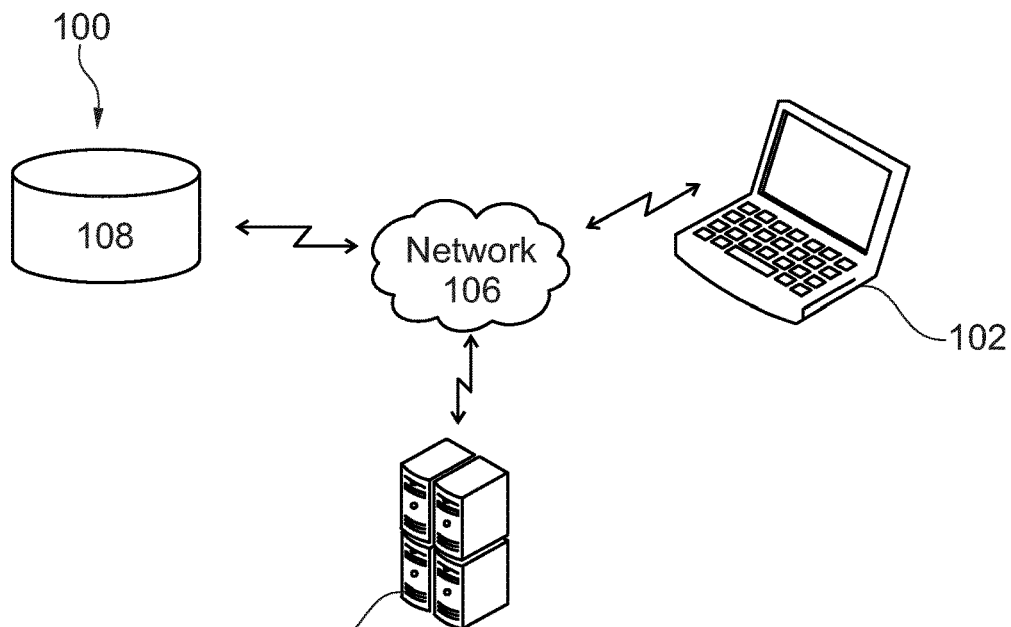
FIG. 1 is an exemplary diagram of an optical article feasibility system according to one example.

Referring now to the drawings, wherein like reference numerals designate identical or corresponding parts throughout several views, the following description relates to a system and associated methodology for determining optical article feasibility. The methodologies described herein determine three dimensional cutout data. A frame, prescription, and lens design relationship is pre-calculated to prevent cancelled jobs due to incompatibility at the manufacturing stage.

In the sense of the invention, the term "optical article" may refer to an ophthalmic article, for example an ophthalmic lens intended to be mounted on spectacle frames.

FIG. 1 is an exemplary diagram of an optical article feasibility system 100, herein referred to as system 100, according to one example. The system 100 provides a three dimensional cutout chart to determine optical article feasibility. The system 100 can include a client device 102 and a database 108 connected to a server 104 via a network 106.

The client device 102 can represent one or more client devices. The client device 102 can be a computer, a laptop, a smart phone, a tablet, a PDA, and the like. The client device 102 can include processing circuitry to independently operated and/or assist in operating the system 100. The client device 102 can include an interface, such as a digital and/or physical keyboard and/or a mouse and/or touch-based input functionality, allowing an operator, for example, to input optical criteria. The users can start up the system 100 through the user interface and obtain the results output by the system.

The server 104 can represent one or more servers connected to the client device 102 and the database 108 via the network 106. The server 104 can include processing circuitry to perform various processing for the system 100 including receiving requests from one or more of the client devices 102 via the network 106. Additionally, the server 104 can transmit information to one or more of the client devices 102 and the database 108 via the network 106. The server 104 may include a CPU 500 and a memory 502 as shown in FIG. 5.

The network 106 can represent one or more networks connecting the client device 102, the server 104, and the database 108. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The database 108 can represent one or more databases. For example, the database 108 may represent a frame database, a lens database, and/or a prescription database. The database 108 may store data associated with a plurality of frames and lenses and patients. The data includes lens cut-out charts, lens material, lens shape, lens diameter, lens thickness, frame size, frame identifier, frame color, frame eye size, frame bridge size, temple length, frame type, frame edge type, frame base curve, frame shape, patient prescriptions, and the like. The database 108 of the system may be implemented in the memory of the server 104. In one embodiment, the database 108 may be a cloud based storage system.

The lens data may provided from a lens provider. The lens data may be updated once a new lens design is available. The lens data may refer to a set of one or more data characterizing an ophthalmic lens. The data may include one or more geometrical characteristics and/or one or more optical characteristic of the lens such as, front and back curve radius, center or edge thickness, refractive index of the material of the lens, and the like. Alternatively or additionally, the server 104 may connect to a lens provider database to check whether updated data is available. The server 104 may also connect to frame manufacturer databases to determine whether new frames data or updated frame data is available. In response to determining that updated data are available, the database 108 is updated.

The server 104 receives optical criteria from the client device 102 and identifies available lens designs. Further, one or more frames may be selected. The optical criteria corresponds to ophthalmic prescription data including one or more of sphere data, cylinder data, axis data, and magnifying power data. Using the optical criteria, the lens design data, and the frame data associated with the selected one or more frames, a calculation is performed to determine whether the lens may successfully cutout. In other words, the server 104 may determine whether the frame selection has a dimension that falls outside of the lens three dimensional data.

In one embodiment, the frames may be identified after the optical criteria are acquired. Then, the server 104 may identify the one or more lenses that are compatible with the frames based on the lens data and the frame data. The compatible lenses are displayed to the user via the client device 102.

The description herein is provided with reference to the system being located and implemented external to the client device 102. However, it is to be understood that the system may alternatively or additionally be implemented within the client device 102, where the client device 102 may contain hardware similar to that illustrated in FIG. 5, and the databases of the system may correspond to a memory of the client device 102. Further, in some embodiments, the system 100 may be implemented as an application that may be downloaded on the client device 102.

Figure 2:
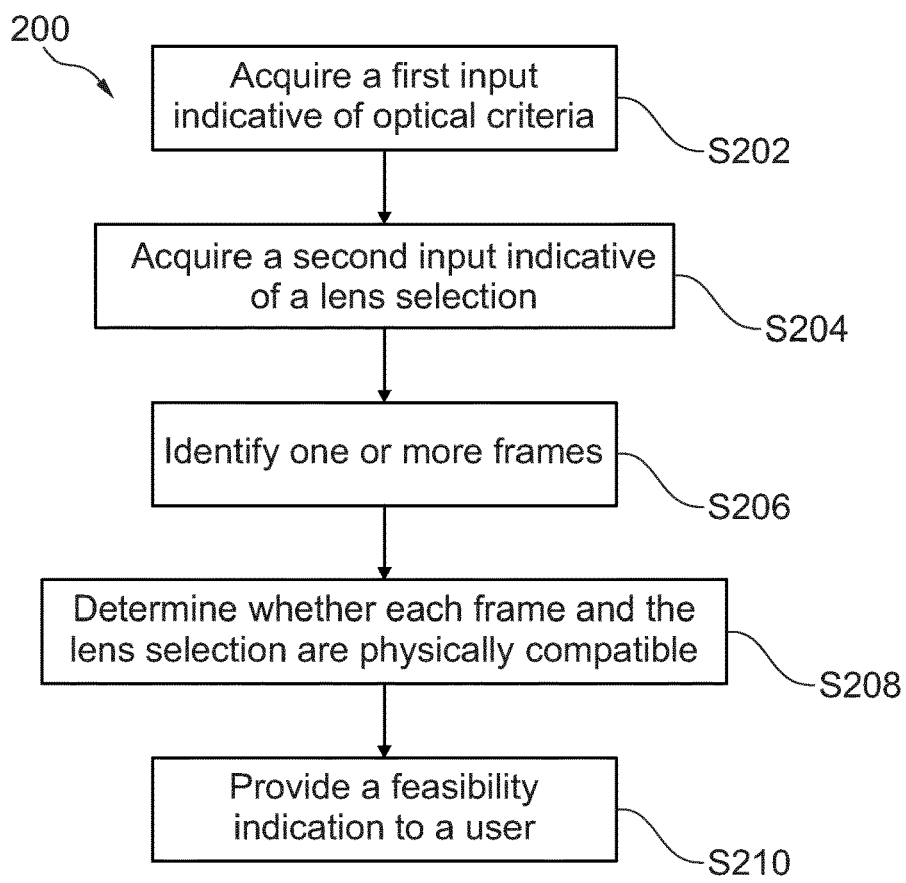
FIG. 2 is a flowchart for a method for determining optical article feasibility according to one example.

FIG. 2 is a flowchart for a method 200 for determining optical article feasibility using the system 100 according to one example.

In S202, a first input indicative of optical criteria associated with a lens is acquired. For example, a user may input data via a user interface. The optical criteria may be an ophthalmic prescription. Alternatively, or additionally, the first input indicative of optical criteria may be retrieved from the database 108. For example, the user may input identification information associated with a patient. Then, the optical criteria are retrieved from the database 108 based on the identification information. For example, the optical criteria may be associated with past ophthalmic prescriptions of the patient.

The first input can also include measurement data that may include, but are not limited to, patient facial measurements, pupillary distance (PD), vertex, pantoscopic tilt, frame wrap, segment height, optical center height, facial shape, and the like. The measurement may be manually measured and inputted or using a measuring system. For example, the measuring system may output the measurement data to the server 104.

In S204, a second input indicative of a lens selection is acquired via the user interface. For example, the second input can be a touch on a portion of a display displaying one or more lens selections. In one example, a set of lens is identified based on the optical criteria. Then, the set of lens is provided to the user via the user interface. The lens design/type may be a progressive lens, a safety lens, a prescription lens, a single vision lens, a bifocal lens, a trifocal lens, and the like.

In S206, one or more frames are identified. The system 100 may prompt the user to identify one or more frames. In one example, a unique identifier such as a universal product code can be input via the user interface.

In S208, the server 104 can determine whether each frame of the one or more frames identified in S206 and the lens selection identified in S204 are physically compatible by fit simulation performed based on three dimensional cutout data determined based on the optical criteria, the frame data, and the lens data. The fit simulation is based on the first input including the optical criteria, the second input, and the frame identified at step S206.

The server 104 may retrieve frame data for each of the identified frames in S206 from the database 108. The server 104 may also retrieve lens data from the database 108 for each of the lens selection. Then, the server 104 may determine the three dimensional cut out data based on the retrieved frame data and lens data and the optical criteria.

In one example, the server 104 may match a frame curve to a lens curve/base curve. The base curve may be determined based on the optical criteria acquired in S202. For example, the server 104 may verify that the frame curve and the lens curve are compatible based on three dimensional representation of the frame curve and lens curve.

In one example, the processing circuitry of the server 104 may compare three dimensional parameters of the frames and the lenses to determine whether the selected frames and the lens are compatible.

In one implementation, the server 104 determines a best front base curve of lens as a function of the optical criteria and the lens material. Then, the server 104 optimizes the front base curve to match the selected frame (i.e., step S206) while respecting lens feasibility. In response to determining that the server 104 cannot match the selected frame and base curve, the server 104 may output a best curve for the selected frame.

In S210, a feasibility indication is provided to a user via the user interface for each of the one or more frames based on the determination in S208. For example, the feasibility indication may include a list of compatible frames and a list of non-compatible frames. In one example, one or more attributes of the displayed one or more frame identifiers is varied. For example, non-compatible frames may be shown using a first color and compatible frames may be shown using a second color. In another example, the user interface may be updated to show only compatible frames.

In one embodiment, in response to determining that the frame, lens, and optical criteria are not compatible, the client device 102 may prompt the user to input alternative frames. Then, the process proceeds to step S208.

In one embodiment, one or more alternative frames associated with each non-compatible frame are identified based on a plurality of factors in response to determining that one or more frames are not compatible with the lens selection. The plurality of factors can include frame color, frame size, frame shape, frame material, and frame collection. In one example, the plurality of factors are weighted. In one embodiment, the weight of each factor is computed by the CPU 500 based on past data. The past data includes stored optical criteria with optical frames data in the memory 502. That is, the combination of weights that has the highest success rate based on the optical criteria may be used. Additionally or alternatively, the weights can be manually set based on what is important to the user. For example, the frame size may have a higher weight based on the user preference. The server 104 may output alternative frames having the frame size preferred by the user.

The server 104 may automatically determine the user preference based on the one or more frames identified in S206. A common attribute may be identified for the one or more frames. For example, the server 104 may determine that the identified one or more frames have a big frame or are black in color. Then, the server 104 may identify an alternative frame that matches the common attribute.

Once a compatible frame is identified, an order including the optical criteria, the lens design, and the compatible frame identifier may be transmitted to the manufacturer.

Although the flowcharts show specific orders of executing functional logic blocks, the order of executing the blocks may be changed relative to the order shown, as will be understood by one of ordinary skill in the art. Also, two or more blocks shown in succession may be executed concurrently or with partial concurrence.

Figure 3:
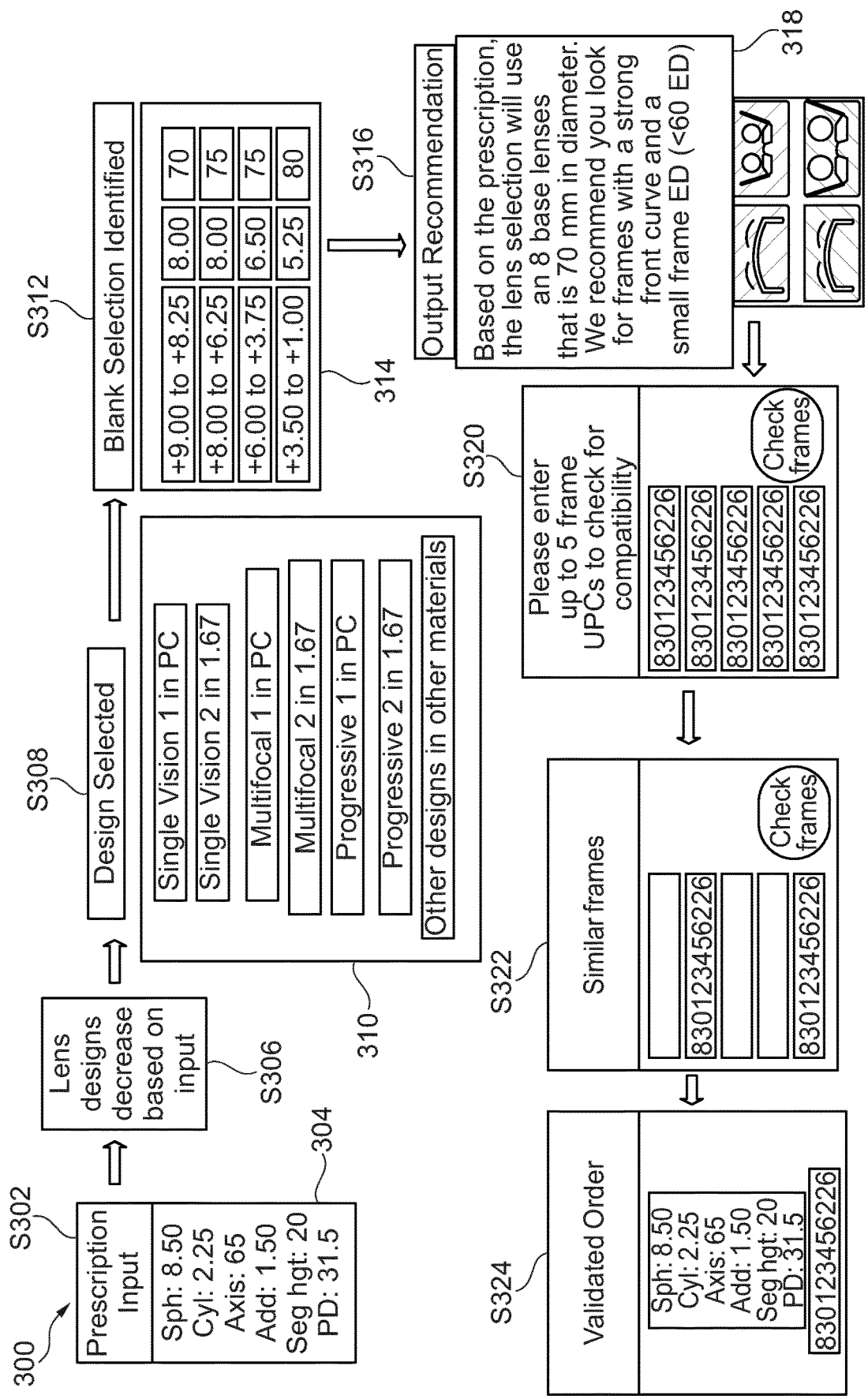
FIG. 3 is a schematic that shows user interfaces of the system according to one example.
Figure 4F:
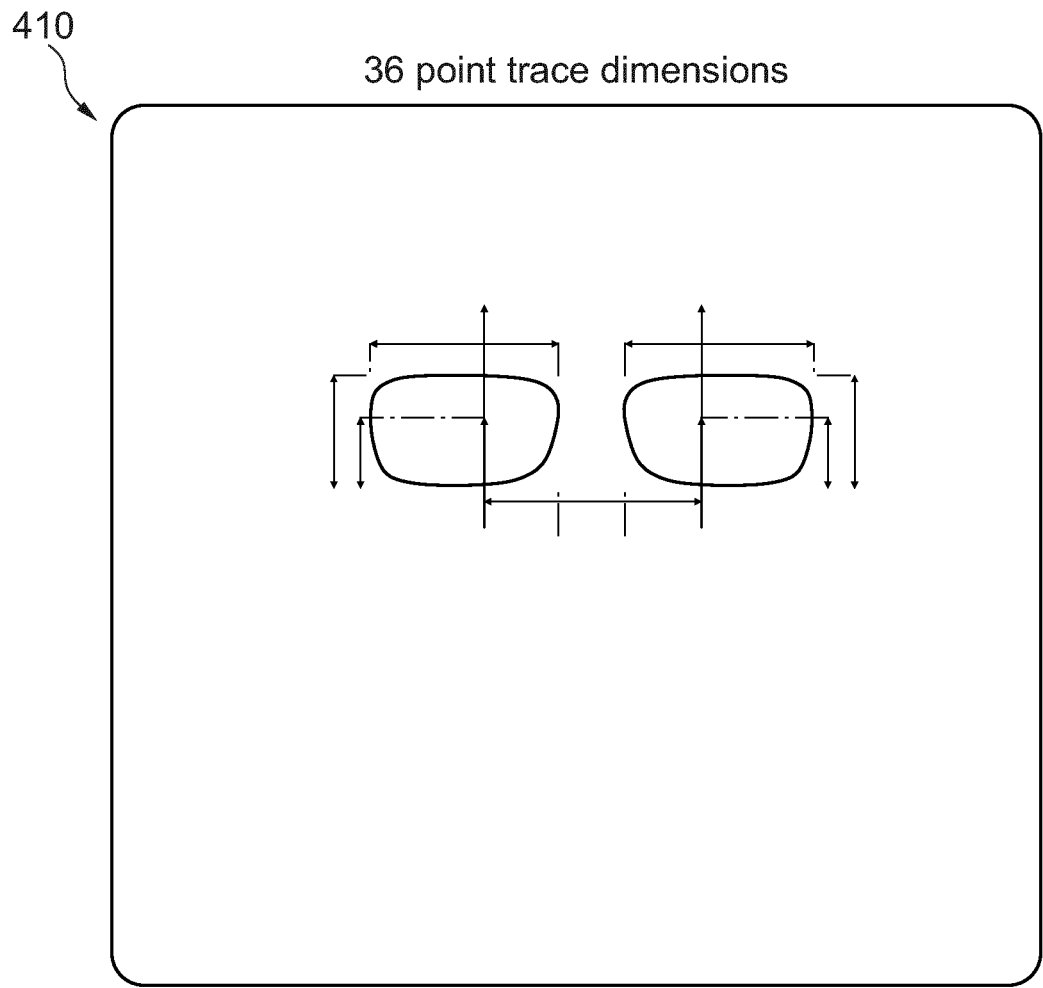

FIG. 3 is a schematic 300 that shows user interfaces of the system according to one example. In S302, ophthalmic prescription data 304 are input to the system 100. In S306, the system 100 may identify one or more lenses based on the ophthalmic prescription data 304. At S308, the user may be presented with one or more lens designs on user interface 310 for selecting one or more lens designs. In S312, the system 100 may identify the blank selection 314. In S316, the system 100 may output a recommendation for a frame selection based on a lens curve determined as a function of the optical criteria via user interface 318. The recommendation may include characteristics of preferable frames based on the lens curve and data. For example, the recommendation may include characteristic for the frame size and the front curve such as a front curve and pupillary distances. The recommendation may also include a visual representation of the characteristics to facilitate the user selection.

At S320, the user may input unique identifiers of one or more frames. The number of frames may be limited to five. At S322, alternative frames may be presented to the user. For example, for each non-compatible frame an alternative frame is presented as described previously herein. In S324, the validated order including the ophthalmic prescription and the selected frame is output via the client device 102.

FIGS. 4A-4F show user interfaces of the system 100 according to one example. The user interface is part of a website, web portal, personal computer application, or mobile device application configured to allow the user to interact with the server 104. The user interface may include a "prescription select" pane 400.

The "prescription select" pane 400 presents the user with input boxes 412 for inputting ophthalmic prescription data. The pane 400 may also include the patient's boxing prescription 414.

The user interface may also include a "lens select" pane 402. The "lens select" pane 402 presents the user with a list 416 of lens designs that are compatible with the ophthalmic prescription data inputted in the "prescription select" pane 400. The "lens select" pane 402 may be presented to the user at step S204 of FIG. 2. The pane 402 may also include a navigational control 418 for accessing a "frame select" pane 404. The navigational control 418, when selected, presents the user with the "frame select" pane 404.

The "frame select" pane 404 may include a drop-down menu, search box, or other selection control for identifying one or more favorite frames by the user. The "frame select" pane 404 may also include a second navigational control 420 for accessing a "favorite frame select" pane 406. The "favorite frame select" pane 406 may include a list of the one or more frames selected using the "frame select" pane 404. The user may try one or more frames from the favorite frames and select one frame using the "favorite frame select" pane 406. The "favorite frame select" pane 406 may also include a third navigational control 422. Upon activation of the third navigational control 422, the user may be presented with a "measurement and feasibility pane" 408.

The "measurement and feasibility" pane 408 may include an input box 424 for inputting fitting measurement. The "measurement and feasibility" pane 408 may also include a message board area 426 to output the feasibility determination. For example, upon the user inputting the fitting measurement, the server 104 may execute step S208 of FIG. 2. The user interface may also include a trace dimensions pane 410. The user interface may also present the user with information regarding lens and the frame, and other information related to eye care.

The features of the present disclosure provide a multitude of improvements in the technical field of optical article manufacturing. The system 100 provides significant time and cost savings. The system and associated methodologies expedites optical article delivery by providing feedback at the point of sale which is the best time to make an alternate decision rather than several days later which delays the optical article delivery. In addition, the system is capable of storing, computing, and analyzing a large amount of data to determine feasibility. Thus, a computer determined feasibility provides the advantage of expedited and more accurate determination based on large amount of processing of data which could not be feasibly done by a human. This solves the problem of any human interaction which could create errors based on the experience of the optician. In addition, generating alerts to the client device and updating the databases when new information and modification from manufacturers and laboratories are detected provide expedited results while minimizing errors. Thus, the system and associated methodology described herein amount to significantly more than an abstract idea based on the improvements and advantages described herein.

In one example, the system and associated methodologies described herein may save an estimated $312K in additional sales. A manufacturing facility may cancel approximately 60 orders per week.

In one implementation, the functions and processes of the server 104 and/or the client device 102 may be implemented by a computer 526. Next, a hardware description of the computer 526 according to exemplary embodiments is described with reference to FIG. 5. In FIG. 5, the computer 526 includes a CPU 500 which performs the processes described herein. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 526 communicates, such as a server or computer.

Further, the claimed advancements may be provided as a utility application, background daemon, or component of an operating system, or combination thereof, executing in conjunction with CPU 500 and an operating system such as Microsoft® Windows®, UNIX®, Oracle® Solaris, LINUX®, Apple macOS® and other systems known to those skilled in the art.

In order to achieve the computer 526, the hardware elements may be realized by various circuitry elements, known to those skilled in the art. For example, CPU 500 may be a Xenon® or Core® processor from Intel Corporation of America or an Opteron® processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computer 526 in FIG. 5 also includes a network controller 506, such as an Intel Ethernet PRO network interface card from Intel Corporation of America, for interfacing with network 106. As can be appreciated, the network 106 can be a public network, such as the Internet, or a private network such as LAN or WAN network, or any combination thereof and can also include PSTN or ISDN sub-networks. The network 106 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 526 further includes a display controller 508, such as a NVIDIA® GeForce® GTX or Quadro® graphics adaptor from NVIDIA Corporation of America for interfacing with display 510, such as a Hewlett Packard® HPL2445w LCD monitor. A general purpose I/O interface 512 interfaces with a keyboard and/or mouse 514 as well as an optional touch screen panel 516 on or separate from display 510. General purpose I/O interface also connects to a variety of peripherals 518 including printers and scanners, such as an OfficeJet® or DeskJet® from Hewlett Packard®.

The general purpose storage controller S20 connects the storage medium disk 504 with communication bus 522, which may be an ISA, EISA, VESA, PCI, or similar, for interconnecting all of the components of the computer 526. A description of the general features and functionality of the display 510, keyboard and/or mouse 514, as well as the display controller 508, storage controller S20, network controller 506, and general purpose I/O interface 512 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for determining optical article feasibility, the method comprising:
   acquiring a first input indicative of optical criteria associated with a lens via a user interface;
   identifying a set of lenses based on the optical criteria;
   providing the set of lenses to the user via the user interface;
   identifying a plurality of frames;
   retrieving frame data from a frame database based on the identified plurality of frames;
   retrieving lens data from a lens database based on the set of lenses;
   determining three-dimensional cutout data based on at least the optical criteria, the frame data, and the lens data;
   determining, using processing circuitry, whether each frame of the plurality of frames and the lenses of the set of lenses are physically compatible by fit simulation performed based on three-dimensional cutout data; and
   providing a feasibility indication to a user via the user interface for each of the plurality of frames based on the determination.

2. The method of claim 1, further comprising:
   identifying one or more alternative frames associated with each non-compatible frame based on a plurality of factors in response to determining that one or more frames are not compatible with the lenses of the set of lenses.

3. The method of claim 2, the plurality of factors includes frame color, frame size, frame shape, frame material, and frame collection.

4. The method of claim 3, wherein each of the plurality of factors is weighted based on a user input.

5. The method of claim 1, wherein the optical criteria corresponds to ophthalmic prescription data including one or more of sphere data, cylinder data, axis data, and magnifying power data.

6. The method of claim 5, wherein the step of acquiring the first input includes obtaining an ophthalmic prescription via the user interface.

7. The method of claim 1, wherein the identifying includes prompting a user input indicative of the one or more frames.

8. The method of claim 1, further comprising:
providing recommended criteria for a frame selection based on a lens curve determined as a function of the optical criteria.

9. The method of claim 8, wherein the recommended criteria includes a front curve and pupillary distances.

10. The method of claim 1, further comprising:
matching a base curve to a lens curve.

11. A system for determining optical article feasibility, the system comprising:
a user interface; and
processing circuitry configured to
acquire a first input indicative of optical criteria associated with a lens via the user interface,
identify a set of lenses based on the optical criteria,
provide the set of lenses to the user via the user interface,
identify a plurality of frames,
retrieve frame data from a frame database based on the identified plurality of frames,
retrieve lens data from a lens database based on the set of lenses,
determine three-dimensional cutout data based on at least the optical criteria, the frame data, and the lens data,
determine whether each frame of the plurality of frames and the lenses of the set of lenses are physically compatible by fit simulation performed based on three-dimensional cutout data, and
provide a feasibility indication to a user via the user interface for each of the plurality of frames based on the determination.

12. A non-transitory computer readable medium storing computer-readable instructions therein which when executed by a computer cause the computer to perform a method for determining optical article feasibility, the method comprising:
acquiring a first input indicative of optical criteria associated with a lens via a user interface;
identifying a set of lenses based on the optical criteria;
providing the set of lenses to the user via the user interface;
identifying a plurality of frames;
retrieving frame data from a frame database based on the identified plurality of frames;
retrieving lens data from a lens database based on the set of lenses;
determining three-dimensional cutout data based on at least the optical criteria, the frame data, and the lens data;
determining whether each frame of the plurality of frames and the lenses of the set of lenses are physically compatible by fit simulation performed based on three-dimensional cutout data; and
providing a feasibility indication to a user via the user interface for each of the plurality of frames based on the determination.

\* \* \* \* \*